United States Patent
Kempster

(10) Patent No.: US 10,108,523 B2
(45) Date of Patent: Oct. 23, 2018

(54) SYSTEMS AND METHODS FOR MEASURING THE CAPACITY AND CAPABILITY OF A MOBILE DEVICE PRIOR TO PROVIDING A SOFTWARE APPLICATION TO THE MOBILE DEVICE

(71) Applicant: Gamesys Ltd., London (GB)

(72) Inventor: Jason Kempster, London (GB)

(73) Assignee: Gamesys, Ltd., London (GB)

( * ) Notice: Subject to any disclaimer, the term of this patent is extended or adjusted under 35 U.S.C. 154(b) by 0 days.

(21) Appl. No.: 15/162,553

(22) Filed: May 23, 2016

(65) Prior Publication Data

US 2016/0342497 A1    Nov. 24, 2016

Related U.S. Application Data

(60) Provisional application No. 62/165,325, filed on May 22, 2015.

(51) Int. Cl.
*G06F 11/00* (2006.01)
*G06F 11/34* (2006.01)
(Continued)

(52) U.S. Cl.
CPC ........ *G06F 11/3419* (2013.01); *G06F 11/302* (2013.01); *G06F 11/3041* (2013.01); *G06F 11/327* (2013.01); *G06F 11/3433* (2013.01)

(58) Field of Classification Search
CPC .............. G06F 11/3419; G06F 11/302; G06F 11/3041; G06F 11/327; G06F 11/3433;
(Continued)

(56) References Cited

U.S. PATENT DOCUMENTS 7,012,616 B1 * 3/2006 Chatterjee ............... G06T 1/60
                                              345/473
9,614,892 B2 * 4/2017 Bidarkar ............ H04L 67/025
(Continued)

FOREIGN PATENT DOCUMENTS

GB            2527672        12/2015

OTHER PUBLICATIONS

Certificate of Grant for Patent No. GB2527672 dated Jun. 1, 2016.

*Primary Examiner* — Joseph D Manoskey
(74) *Attorney, Agent, or Firm* — Fincham Downs LLC; Magdalena M. Fincham

(57) ABSTRACT

Systems, methods and articles of manufacture provide for determining the capabilities of a remote mobile devices (e.g., determining the processing capability and/or memory capacity). In one embodiment, capability is determined by displaying a series of images and measuring the time required to display those images. Different series of images, comprising different numbers of images, may be displayed and the corresponding times for each series compared. A particular version of software (or a configuration or parameter of software) to be output to or on the mobile device is then selected based on the determined capabilities. For example, graphics which do not require relatively low processing power and/or memory capacity may be selected for output of an electronic game if the mobile device is determined to have relatively low capabilities.

18 Claims, 5 Drawing Sheets

(51) Int. Cl.
*G06F 11/30* (2006.01)
*G06F 11/32* (2006.01)

(58) Field of Classification Search
CPC ............. G06F 11/3006; G06F 11/3037; G06F 11/3051; G06F 11/3409; G06F 11/3428
See application file for complete search history.

(56) References Cited

U.S. PATENT DOCUMENTS

| | | |
|---|---|---|
| 2002/0130870 A1 | 9/2002 | Ebihara |
| 2012/0036498 A1* | 2/2012 | Akirekadu .......... G06F 11/3495 717/124 |
| 2012/0044251 A1* | 2/2012 | Mark .................... G06F 3/0485 345/474 |
| 2014/0137080 A1* | 5/2014 | Huang ................ G06F 9/44505 717/121 |
| 2014/0204101 A1* | 7/2014 | Ramadoss ................. G06T 1/20 345/522 |
| 2014/0325054 A1* | 10/2014 | Agrawal ............. G06F 11/3419 709/224 |
| 2015/0007029 A1* | 1/2015 | Gong ............... H04N 21/44008 715/719 |
| 2015/0019715 A1 | 1/2015 | Ronen et al. |

\* cited by examiner

SYSTEMS AND METHODS FOR MEASURING THE CAPACITY AND CAPABILITY OF A MOBILE DEVICE PRIOR TO PROVIDING A SOFTWARE APPLICATION TO THE MOBILE DEVICE

CLAIM OF PRIORITY

The present application claims priority under 35 U.S.C. § 119(e) to, and is a non-provisional of, U.S. Provisional Patent Application No. 62/165,325 filed on May 22, 2015 in the name of Jason Kempster and titled MOBILE DEVICE ANALYSIS, the contents of which are hereby incorporated by reference herein.

The present application is also related to UK Application No. 1508793.5, filed with the United Kingdom Patent Office on May 22, 2015, published as GB 2527672 on Dec. 30, 2015 and granted as Patent No. GB2527672 as of Jun. 1, 2016, which is titled DATA SYNCHRONISATION. The entirety of this application is incorporated by reference herein.

BACKGROUND

The present disclosure relates to the remote analysis of the performance capability and/or capacity (e.g., processor performance capability and/or memory capacity) of a computing system (e.g., a mobile device) in order to select a version of a software application (or a value for a parameter of the software application) to be utilized on the computing device in a manner that maximizes the benefits of the software application in view of the determined capability or capacity of the computing device.

Mobile devices which connect to the internet using cellular or WiFi data connections are commonly utilized for playing games and running other applications. Often such applications take the form of JavaScript (or other similar languages) executed within a web browser running on the mobile device. Such a method is attractive as it avoids the need to distribute a compiled application for execution at the remote device which would make it harder for users to obtain the application.

Mobile devices are available with a very wide range of capabilities in terms of processor power and memory size. Such capabilities can limit the applications that can be usefully executed on the mobile device. A less powerful device may render complex graphics slowly giving a reduced user experience, or even being so slow as to be unusable. Similarly, limited memory capacity limits the amount of data that can be stored and hence may limit the complexity of software and graphics that can be used in an application.

Designing applications for high-performance devices may thus lead to a poor user-experience on low-performance devices, whereas designing applications for low-performance devices may limit developer's ability to give the best experience to owners of high-performance devices.

Programming languages executed within web-browsers have very limited access to system parameters such as processor power or other capability or available memory or memory capacity (for example, JavaScript cannot access memory capacity). It has therefore not been possible to measure such parameters when running applications within web-browsers. Although it can be possible to utilize identifying information of a device (e.g., model, year or version) to look up the performance capabilities of a device, the number of devices is so great, and the data so inconsistent, that this is not efficient or reliable. Additionally, such a look up based on identifying information would not reveal actual available memory or processing power of a particular device but only provide an expected or ideal processing capability or available memory (e.g., degradation of performance power or memory capacity may occur over time or as a device has more and more applications stored thereon).

Although the issues described above are of particular a concern with respect to mobile devices, similar concerns may also arise in other computer platforms where programs do not have access to system parameters.

Accordingly, Applicant has recognized that there is a need for systems and methods that are operable to detect and/or measure the capability and/or capacity of a computing device and utilize the results of this detecting and/or measuring to optimize the output of a software application to or on the computing device. For example, a particular version of the software application may be selected and/or particular values for respective parameters of the software application (e.g., graphic complexity or sophistication) may be selected such as to optimize the user experience in view of the capability and/or capacity of the computing device.

BRIEF DESCRIPTION OF THE FIGURES

An understanding of embodiments described herein and many of the attendant advantages thereof may be readily obtained by reference to the following detailed description when considered with the accompanying drawings, wherein.

DETAILED DESCRIPTION OF THE FIGURES AND EXAMPLE EMBODIMENTS

Figure 1:
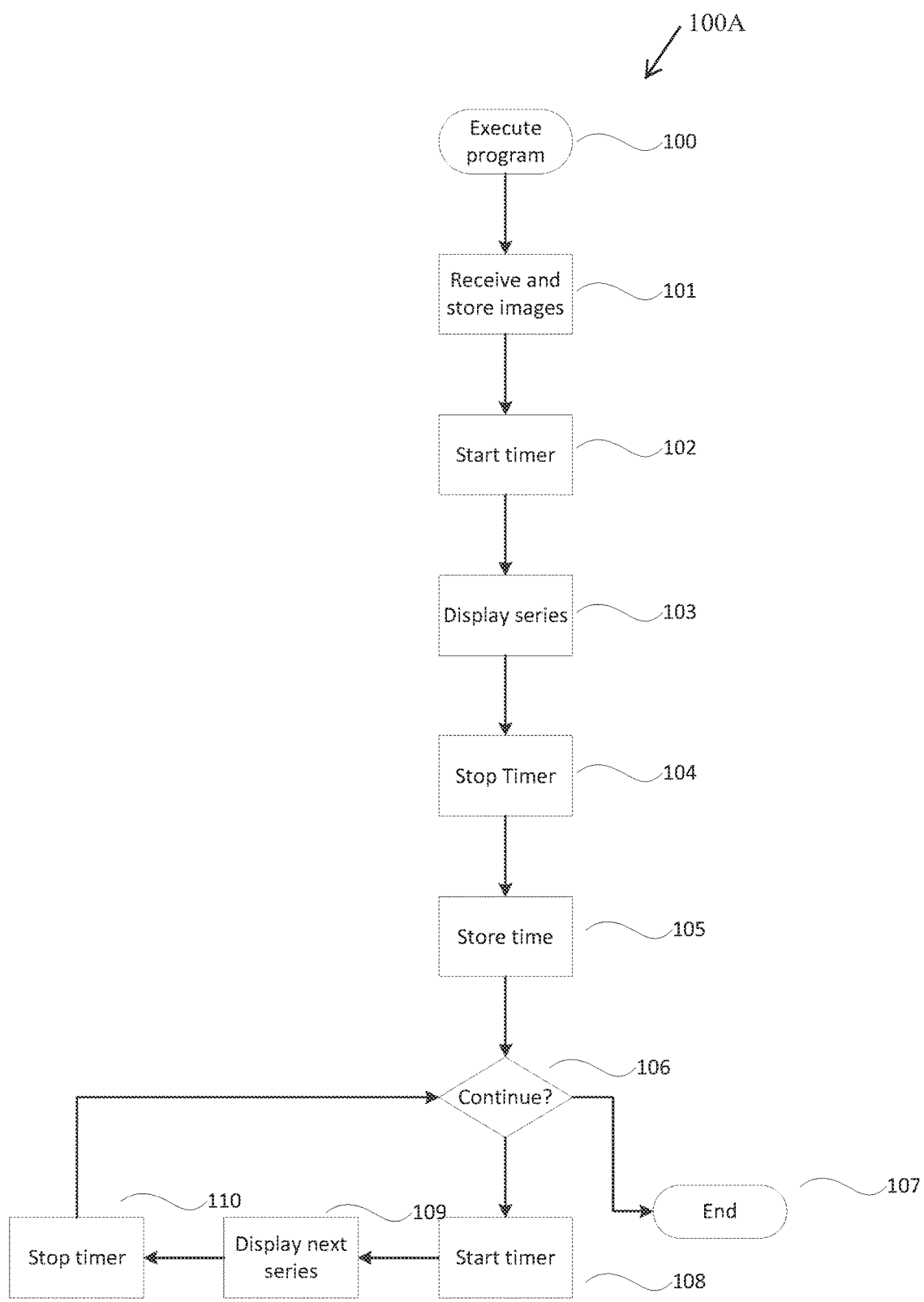
FIG. 1 is a flowchart illustrating one example process, according to one or more embodiments described herein is a schematic diagram of an embodiment of a gaming system in accordance with one or more embodiments described herein.

In accordance with some embodiments, provided herein are systems, methods and articles of manufacture that allow for the optimization of an application to be utilized on a device by first measuring or detecting at least one value for at least one parameter that may govern or limit the rendering or output of the application (e.g., a capability, performance capacity or memory capacity of the device). In accordance with some embodiments, once the at least one value of the at least one parameter is measured or detected, the result of this measuring or detecting may be utilized to select a particular version of an application to be utilized on the device (or to select a value of at least one parameter of the application as it is it be utilized on the device).

In accordance with some embodiments, described herein are systems, methods and articles of manufacture that provide for analyzing mobile device performance, comprising the steps of receiving a plurality of images at a mobile device and storing the images in non-working memory, each image being a transparent image; starting a timer; retrieving a first series of the plurality of images from the non-working memory and displaying the first series of images on a display of the mobile device; stopping the timer to determine the time taken to display the first series of images, and storing that time; until the time taken to display a series of images is above a threshold time or a predetermined number of series of images have been displayed, repeating the steps of starting, retrieving, displaying, and stopping for further series of images of the plurality of images, wherein each further series of images comprises a greater number of images than the previous series, and calculating an indication of processor capability and memory capacity based at least in part on the times to display the series of images. In some embodiments, calculating an indication of the processor capability and/or the memory capacity may be done by a remote server device based on data (e.g., an indication of the time taken to display a particular series of images) received from the mobile device while in other embodiments such calculating may be done by the mobile device itself. It should be noted that although many embodiments described herein refer to a mobile device, such descriptions may equally apply to other types of computing devices and the embodiments described herein are not limited to use for mobile devices.

In one embodiment, the memory capacity may be calculated based on the number of images in a series displayed prior to a series for which the frame rate was below a predetermined threshold.

In one embodiment, the processor capability may be calculated based on the average frame rate achieved for the display of a series of images, where the frame rate for that series of images is substantially consistent (e.g., within a maximum predetermined range of one another) with the frame rate for at least one other series of images.

In one embodiment, systems, methods and articles of manufacture may further comprise the step of transmitting the indication of processor capability and/or memory capacity to a remote server. In embodiments in which the memory capacity and/or the processor capability is calculated by a processor of the remote server, the systems, methods and articles of manufacture may alternately comprise a step of transmitting data for such calculation(s) (e.g., an indication of time taken to display a particular series of images, a number of images in the series, etc.).

In one embodiment, the systems, methods and articles of manufacture may further provide for utilizing the indication of processor capability and/or memory capacity to control at least one aspect of how a program (e.g., a software application) executes on the mobile device.

In one embodiment, the systems, methods and articles of manufacture may further provide for utilizing the indication of processor capability and/or memory capacity to determine whether, when executing at least one program, high quality or low quality images (or which set of images, as some sets may include fewer images or exclude certain more complex images) are requested from a remote server. It should be noted that the term "images" includes both still and animated images or graphics.

In one embodiment, the systems, methods and articles of manufacture may further provide for utilizing, at the remote server, the indication of processor capability and/or memory capacity to determine whether to transmit high quality or low quality images (or which set of images to transmit) to the mobile device in response to a request for an image.

In accordance with some embodiments, systems, methods and articles of manufacture provide for analyzing a mobile device performance by transmitting at least one indication of the mobile device's identity to a remote server; checking at the remote server whether capability and/or capacity information is available for the mobile device as defined by the transmitted indication(s) (e.g., based on prior measurements or detections of this mobile device's capability and/or capacity from previous communications with the device); and, if capability and/or capacity information is not available, performing the method described above.

Methods and systems are described below to enable the measurement of the performance capability and/or memory capacity of a remote device where software has limited access to system parameters. For convenience the following description will be given with reference to a mobile device and software executed within a web-browser, but the principles discussed are applicable to any device or software.

Certain aspects, advantages, and novel features of various embodiments are described herein. It is to be understood that not necessarily all such advantages may be achieved in accordance with any particular embodiment. Thus, for example, those skilled in the art will recognize that the invention(s) described herein may be embodied or carried out in a manner that achieves one advantage or group of advantages as taught herein without necessarily achieving other advantages as may be taught or suggested herein.

Although several embodiments, examples and illustrations are disclosed herein, it will be understood by those of ordinary skill in the art that the embodiments described herein extend beyond the specifically disclosed embodiments, examples and illustrations and includes other uses of the invention(s) and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined generally throughout the present description.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "user", as used herein unless specified otherwise, may refer to any type, quantity or manner of entity associated with the use of a computing device. For example, an owner of a mobile device who attempts to use a software application via a web browser of the mobile device in accordance with embodiments described herein may be referred to as a user of the mobile device.

The term "player," as used herein unless specified otherwise, may refer to any type, quantity, and or manner of entity associated with the play of a game and may be a type of user of a computing device. In some embodiments, a player may comprise an entity (i) conducting play of an online game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise a virtual player (i.e., a player represented by software controlling betting decisions for a player position).

Some embodiments described herein are associated with a "player device", a "mobile device" or a "network device". As used herein, a "player device" and a "mobile device" is each a respective subset of a "network device". The "network device", for example, may generally refer to any device that can communicate via a network, while the "player device" or "mobile device" may comprise a network device that is owned and/or operated by or otherwise associated with a player or user. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, a tablet or a wireless or cellular telephone or smart phone. Player, mobile and/or network devices may, in some embodiments, comprise one or more network components.

Referring now to FIG. 1, illustrated therein is a flow chart of a process 100A for assessing device capability and/or capacity for execution on a device, consistent with some embodiments. Process 100A may be performed, for example, by at least one component of computer system 200A (e.g., a user device or mobile device 201). It should be noted that additional and/or different steps may be added to those depicted and that not all steps depicted are necessary to any embodiment described herein. Process 100A and process 400A (FIG. 4) is each an example process of how some embodiments described herein may be implemented, and neither should be taken in a limiting fashion. A person of ordinary skill in the art, upon contemplation of the embodiments described herein, may make various modifications to process 100A and/or process 400A without departing from the spirit and scope of the embodiments in the possession of applicant.

At step 100 a mobile device executes a software program to measure capability of the mobile device. The program may be a stand-alone program or may be part of a program, or set of programs providing other services to a user. For example the mobile device may be executing a game and within that program a section or module is provided to assess device capability, which section is executed at a relevant time. Similarly, the assessment program may be provided as a stand-alone program which is called by the game program when required such that the same assessment program can be used by multiple programs. For example, it is common for software providers to use a single "game engine" program to provide core services which are utilised by a number of individual game programs to save duplication of software code. The program which executes the process 100A as a subroutine or module may, in accordance with some embodiments, be downloaded or accessed via a game provider. For example, it may be accessed from a remote server of a game provider via a web browser of the mobile device or may be downloaded to the mobile device from the remote server.

As described herein, in accordance with some embodiments a software application or program may be downloaded and/or installed onto a computing device (e.g., a user computing device such as a mobile device or server device), for facilitating one or more functions, programs or processes described herein. Such a software application or program may further comprise one or more software module(s) for directing a processor of the player device to perform certain functions. In accordance with some embodiments, software components, applications, routines or sub-routines, or sets of instructions for causing one or more processors to perform certain functions may be referred to as "modules". It should be noted that such modules, or any software or computer program referred to herein, may be written in any computer language and may be a portion of a monolithic code base, or may be developed in more discrete code portions, such as is typical in object-oriented computer languages. In addition, the modules, or any software or computer program referred to herein, may in some embodiments be distributed across a plurality of computer platforms, servers, terminals, and the like. For example, a given module may be implemented such that the described functions are performed by separate processors and/or computing hardware platforms.

It should be understood that any of the software module(s) or computer programs described herein may be part of a single program or integrated into various programs for controlling a processor of a computing device. Further, any of the software module(s) or computer programs described herein may be stored in a compressed, uncompiled, and/or encrypted format and include instructions which, when performed by a processor, cause the processor to operate in accordance with at least some of the methods described herein. Of course, additional and/or different software module(s) or computer programs may be included and it should be understood that the example software module(s) described herein are not necessary in any embodiments. Use of the term "module" is not intended to imply that the functionality described with reference thereto is embodied as a stand-alone or independently functioning program or application. While in some embodiments functionality described with respect to a particular module may be independently functioning, in other embodiments such functionality is described with reference to a particular module for ease or convenience of description only and such functionality may in fact be a part of integrated into another module, program, application, or set of instructions for directing a processor of a computing device.

According to some embodiments, the instructions of any or all of the software module(s) or programs described herein may be read into a main memory from another computer-readable medium, such from a ROM to RAM. Execution of sequences of the instructions in the software module(s) or programs may cause a processor to perform at least some of the process steps described herein. In alternate embodiments, hard-wired circuitry may be used in place of, or in combination with, software instructions for implementation of the processes of the embodiments described herein. Thus, the embodiments described herein are not limited to any specific combination of hardware and software.

Referring now to process 100A in particular and the execution thereof by or for a computing device (e.g., a mobile device), at step 101 a set of images are received by the mobile device and stored. The images may be stored, for example, into a cache area of a memory of the computing device (e.g., on a removable memory card or built-in storage memory, rather than in working RAM). Each of the set of images may, in accordance with some embodiments, utilize a different filename since many browsers are intelligent enough to consolidate multiple files of the same name into one file. In a particular example the images are transparent images such that when rendered to the display they are not visible to the user. For example, the PNG image format may be utilised with all pixels set to be transparent.

In accordance with some embodiments, a set of images may be received at the mobile device in response to a request transmitted by that mobile device specifically for the images. In another embodiment, a set of images may be received at the mobile device in response to a request from the mobile device to access or download another software application. For example, the process 100A may be launched in response to the mobile device requesting to access or download an online game that has not previously been accessed by or downloaded onto the mobile device, thus triggering a process for detecting or measuring a processing capability and/or memory capacity of the mobile device, so that the software application being requested by the mobile device may be selected, modified or configured so as to maximize the user experience, based on the processing capability and/or memory capacity of the mobile device. In some embodiments, a set of images may be transmitted to the mobile device together with the program being executed. Thus, in accordance with some embodiments, step 101 may be performed prior to step 100 at an unrelated time during download of the program, rather than during execution.

At step 102 a timer is started by the program, and the program then instructs, in step 103, a display of a first series of images from the set of images. In accordance with some embodiments, the display of each of the images in the series is conducted in a conventional way as appropriate for the particular programming language and operating system running the program. For example, the display of each image may be performed by transferring the image data to working RAM, and then utilizing a graphics processing unit (which may be implemented in hardware and/or software) to display each image on the mobile device's screen. In embodiments in which the images are transparent, as noted above, the user will not see any change in the display but the processing steps are the same as if the image contained visible content. In accordance with some embodiments, each image in the series of images is added to the display such that the previous images in the series remain in RAM rather than being removed, such that the total memory used increases over time as more images are displayed.

At step 104, once the first series of images has been displayed, the timer is stopped, and at step 105 the elapsed time is stored. In accordance with some embodiment, the number of images in the first series may be stored with the time (e.g., in a memory of the mobile device and/or in a memory of a remote server that may be working in conjunction with the mobile device during process 100A).

At step 106 it is decided whether to continue with further series of images or to stop at step 107. The decision whether to continue displaying further series may be based on a number of factors or combination of factors. For example, the number of series displayed thus far, the time taken to display the most recent series, or the cumulative time to display the series. For example, in accordance with some embodiments process 100A may stop after displaying a series of a certain number of images (e.g., 30 images). In another example, process 100A may stop if the frame rate (calculated from the time to display each image) of the latest series is determined to be at or below a predetermined frame rate (e.g., if the frame rate is determined to be less than an average of 5 frames per second (fps)).

If the process 100A continues, at step 108 a new timer is started and at step 109 a second series of images from the set of images is displayed. In accordance with some embodiments, each subsequently displayed series of images comprises more images than a previously displayed series of images. Thus, the second series of images, in accordance with some embodiments, comprises more images than the first series of images. In accordance with some embodiments, there may be overlap of images among different series such that the same image may be included in more than one series. For example, the second series of images may comprise all the images in the first series plus at least one additional image. In this manner, each series of images may cause more RAM to be utilized than a previous series of images.

At step 110 the timer for the display of the second series of images is stopped and the elapsed time is stored. The number of images in the second series may be stored with the corresponding elapsed time. The process 100A may then return to step 106. At step 106 the decision whether to continue with a further series of images may include a comparison of the most recent frame rate to frame rates from previous series. For example, process 100A may stop if at least one of the factors described above with reference to step 106 is satisfied or another factor is satisfied (e.g., if the frame rate has decreased by more than a certain magnitude, such as by more than 50%).

The data obtained from the process 100A may be used to infer or detect the capability of the mobile device on which the method is performed. For example, the processing capability and/or memory capacity may be inferred based on the measurements (e.g., fps) obtained from displaying the at least one series of images. Thus, process 100A is one example of how a processing capability and/or memory capacity of a mobile or other computing device may be measured and/or detected prior to installing, downloading or making accessible to the device a particular software application.

It should be noted that Applicant has recognized that implementation of process 100A has generally found that the frame rate for smaller series of images which do not fill up the working RAM is consistent. The frame rate or time taken to display these series can be utilized to infer the processing capability, in particular graphic processing capability, of the mobile device. The faster each series is displayed (i.e. the lower the value of the timer) the more powerful the mobile device is. A typical frame rate is in the range of 5-60 fps.

As described above, in accordance with some embodiments as images are displayed they are stored in the working RAM of the device. The amount of memory consumed by the process 100A thus increases as the series of images displayed gets larger. Tests have shown that as the memory of a device fills up the time taken to display images rapidly increases (i.e. the frame rate decreases). Once there is insufficient RAM to store further images the oldest image must be discarded and the next loaded, thus slowing down processing. For example, a computing device may display 25 fps under normal operation, but only 2 fps as the memory approaches being full. The point at which this increase occurs can be utilized to infer the amount of working RAM available for programs executed on the device, by calculating the memory space required for the images displayed by the process for assessing the capabilities of the device (e.g., by process 100A).

In accordance with some embodiments, the data obtained using process 100A or a similar process may be analyzed to infer the capability of a mobile device, which may then be utilized to configure software for the device (e.g., for executing on the device) according to its particular capabilities (or limitations thereof) or to select a particular version of software for the device. It is therefore possible to optimize software according to the capabilities of particular devices. For example, if it is detected that a particular device has good processing capability and/or a large memory, the software program to be installed on or made available to the device (e.g., an online game application) may be configured (or a particular version of it selected) such that it utilizes high quality graphics when running to give an improved appearance, whereas if the processing capability and/or memory is poor then the software application may be configured (or a version of the software application may be selected) such that it utilizes reduced quality graphics to ensure the user experience is not degraded by slow processing.

The data gathered from the process 100A may be utilized in various ways. For example, at least one performance indicator may be stored for indicating performance parameters of the mobile device (e.g., fps measurement, a category or classification assigned to the device based on fps measurements, etc.) determined according to the process 100A. The at least one performance indicator may be stored, for example, in a memory of the mobile device and/or a memory of a remote server of a software application provider (e.g., a server of an online game provider that utilizes process 100A to optimize the experiences of its users by selecting the game version or game parameter that is most appropriate for the capabilities of the user's device). When the mobile device subsequently requests to access or download software applications or programs (e.g., from a game provider website or server), the at least one performance indicator may be read (e.g., by the mobile device or by the server of the game provider). A particular version of the software application may then be selected (or values or selections for parameters of the software application may be selected and the software application configuration in accordance therewith) based on the at least one performance indicator. For example, a program may request images from a server for display to a user. The images may be requested either when the program is initially installed or run, or as images are required. The server may store a number of versions of the image, different versions corresponding to different processing power or device capabilities (e.g., images of varying quality, resolution or size, or still images vs. animated images). When requesting the images the at least one performance indicator may be utilized (e.g., by the program, by the mobile device and/or by the server) to determine which version of the images (e.g., higher or lower quality) to utilize for the program or game. As described above, selecting images of an appropriate quality for the capabilities of the particular device (or selecting a software version having recommended processing requirements that are satisfied by the capabilities of the mobile device) may lead to an improved user experience.

Figure 2:
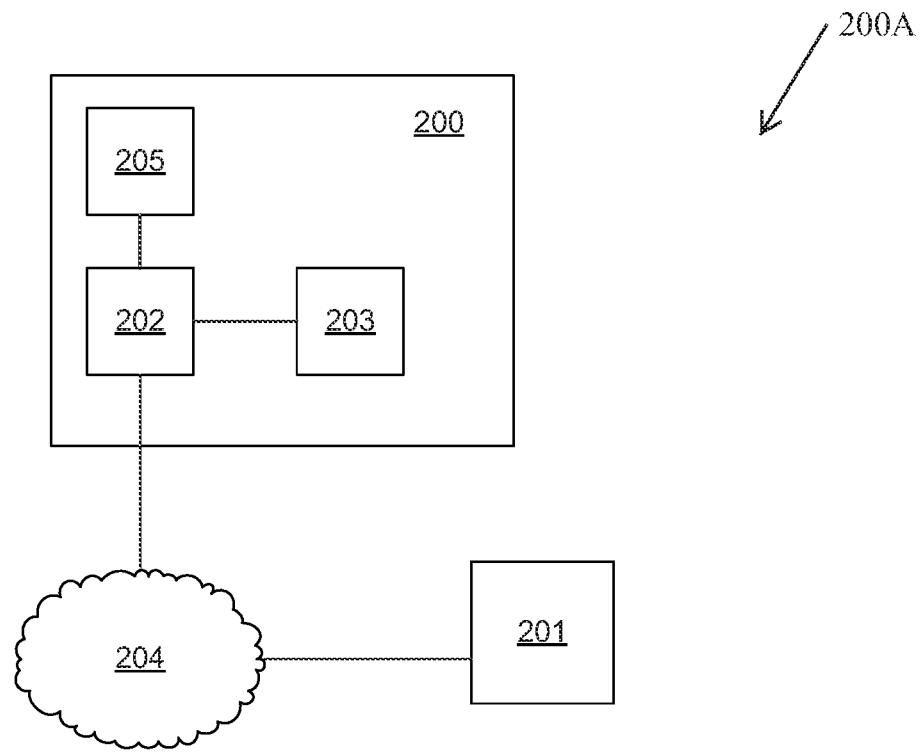
FIG. 2 is a schematic diagram of an embodiment of a computing system (e.g., a remote server device) in accordance with one or more embodiments described herein.

Referring now to FIG. 2, illustrated therein is a schematic diagram of an example computing environment 200A for the distribution of software from a system 200 to a remote mobile device 201, consistent with some embodiments. The system 200 comprises a distribution system 202 for receiving requests for content, stored on storage system 203 from remote devices 201 and transmitting the requested content in reply. For example, the server system may be a web-server for receiving requests via the internet 204 using the http protocol (and other related protocols) and the user of the remote device 201 may make the request using a web-browser running on the remote device 201. The content may be applications for execution at the remote device 201, or images or other data for use or display at the remote device 201. The requests for content may be made specifically by a user, or may be made by software running at the remote device 201 for data required by the software to perform its functions.

In accordance with some embodiments, the system 200 may also comprise a device database 205 which stores details of devices, or types of devices, which have previously accessed the system 200 and parameters or performance indicators representing their capability. The data may be stored in relation to particular mobile device model, a uniquely identified particular device or in relation to other means of identifying the type of device or particular device. The system 200 may receive performance parameters from mobile devices the capabilities of which have previously been assessed utilizing process 100A (FIG. 1) or a similar process, the results of which assessment have been stored in database 205.

A result of process 100A (FIG. 1) may comprise, for example, a respective value for at least one of a parameter representing a processor capability, a parameter representing a memory capacity and/or data based upon which the processor capability and/or memory capacity may be calculated. For example, the database 205 may store each individual device's parameters, may store an average of the parameters received for each type of device or may store a value indicating a category or classification of a capability that is determined based on the foregoing. For example, assuming a three-level categorization of device capabilities is utilized (three being used for convenience only and not intended to be limiting), whether a device is considered a "Level A" device that has high capabilities and should thus be provided with a relatively highly processing/memory intensive version of a software application (e.g., one utilizing large file size images or animated images), a "Level B" device that has average capabilities and should thus be provided with a mid-grade processing/memory intensive version of the software application (e.g., one utilizing medium size images or only some animated images) or a "Level C" device that has low capabilities and should thus be provided with a low processing/memory intensive version of the software (e.g., one utilizing small file size images or non-animated images).

In embodiments in which a mobile device transmits parameters or performance indicators to the database 205, the mobile device may provide additional information such as its model type or other information on the characteristics of the device that may be relevant, or may provide other identifier information (such as type allocation code (TAC)) which can be used to obtain that model information and/or other information on the characteristics of the device.

In some embodiments, one or more components of a computer system utilized to implement one or more processes described herein (e.g., computer system 200 or computer system 201 of FIG. 2) may further comprise a processor (e.g., one or more microprocessors, one or more microcontrollers, one or more digital signal processors). The processor may receive instructions (e.g., from a memory or like device), and execute those instructions, thereby performing one or more processes defined by those instructions. Instructions may be embodied in, e.g., one or more computer programs and/or one or more scripts. In some embodiments a processor (e.g., one or more microprocessors, one or more microcontrollers, one or more digital signal processors, or one or more processing units) of a computer system described herein may receive instructions (e.g., from a memory or like device), and execute those instructions, thereby performing one or more processes defined by those instructions. Instructions may be embodied in, e.g., one or more computer programs and/or one or more scripts. As described herein, in accordance with some embodiments a software application or program may be downloaded and/or installed onto a computing device (e.g., a player device or server device), for facilitating one or more functions, programs or processes described herein.

Figure 3:
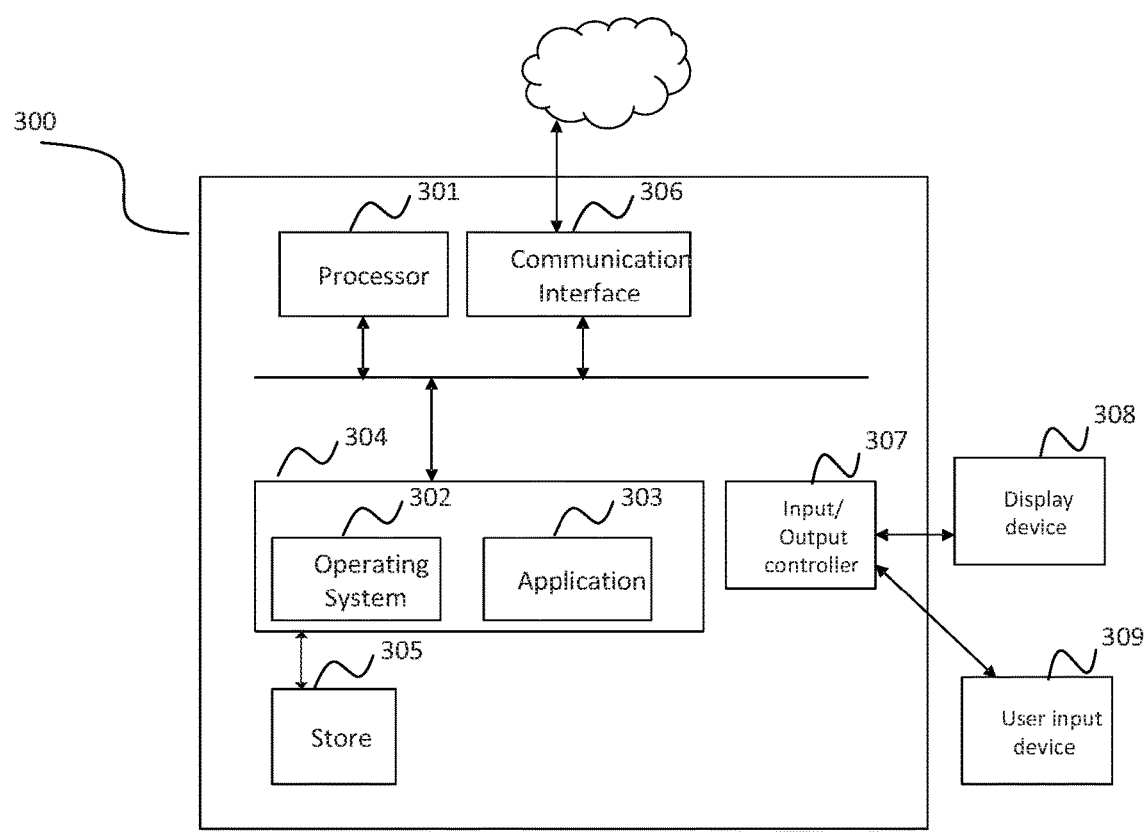
FIG. 3 is a schematic diagram of an embodiment of a computing system (e.g., a user's mobile device) in accordance with one or more embodiments described herein.

Referring now to FIG. 3, illustrated therein is a schematic diagram of various components of an exemplary computing device 300. Computing device 300 may comprise, for example, a mobile device such as may be used to implement at least one step of process 100A (FIG. 1) and/or that may comprise device 201 (FIG. 2). Device 300 may be a mobile device in accordance with the specific example provided above, or may be any form of computing device via which at least one process described herein may be implemented.

In accordance with some embodiments, computing device 300 comprises one or more processors 301 which may be microprocessors, controllers or any other suitable type of processors for processing computer executable instructions to control the operation of the device in order to provide the functionality described hereinbefore. In some examples, for example where a system on a chip architecture is used, the processors 301 may include one or more fixed function blocks (also referred to as accelerators) which implement a part of the methods described hereinbefore in hardware (rather than software or firmware).

Platform software comprising an operating system 302 or any other suitable platform software may be provided at the computing-based device to enable application software 303 to be executed on the device. In a particular example, application 303 may comprise a game engine which provides services to various game programs, such that the software to provide common functions can be shared between multiple programs.

The computer executable instructions may be provided using any computer-readable media that is accessible by computing device 300. Computer-readable media may include, for example, computer storage media such as memory 305 and communications media. Computer storage media, such as memory 305, may include volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 305) is shown as a component of computing device 300 it will be appreciated that the storage may be distributed or located remotely and accessed via a network or other communication link (e.g. using communication interface 306). Memory 305 may also provide a storage system for storing data for use by the computing system, for example in the form of databases.

Computer executable instructions (software) and data may be stored using any computer-readable media that is accessible by computing based device 300. Computer-readable media may comprise discrete sections or types of memory for use for different purposes. For example, the computer-readable media may comprise RAM 304 for use as working memory by the device in which currently-active applications are stored and run from, and in which currently required resources are stored. The computer-readable media may also comprise other memory 305 for the storage of data not immediately required. For example memory 305 may utilize a non-volatile storage means, such as removable data storage cards (e.g., SD cards), for the storage of software or resources not immediately required. Data may be transferred between memories 304 and 305 as different functions are performed by the device. As will be appreciated the computer-readable media may be provided utilizing any appropriate technology.

Communication interface 306 may provide communication to remote systems, for example via wired or wireless internet or other data connections.

The computing device 300 may also comprise an input/output controller 307 arranged to output display information to a display device 308 which may be separate from or integral to the computing device 300. The display information may provide a graphical user interface. The input/output controller 307 may also be arranged to receive and process input from one or more devices, such as a user input device 309 (e.g. a mouse or a keyboard). In an embodiment the display device 308 may also act as the user input device. The input/output controller 606 may also output data to devices other than the display device, e.g. a locally connected printing device (not shown in FIG. 3).

Figure 4:
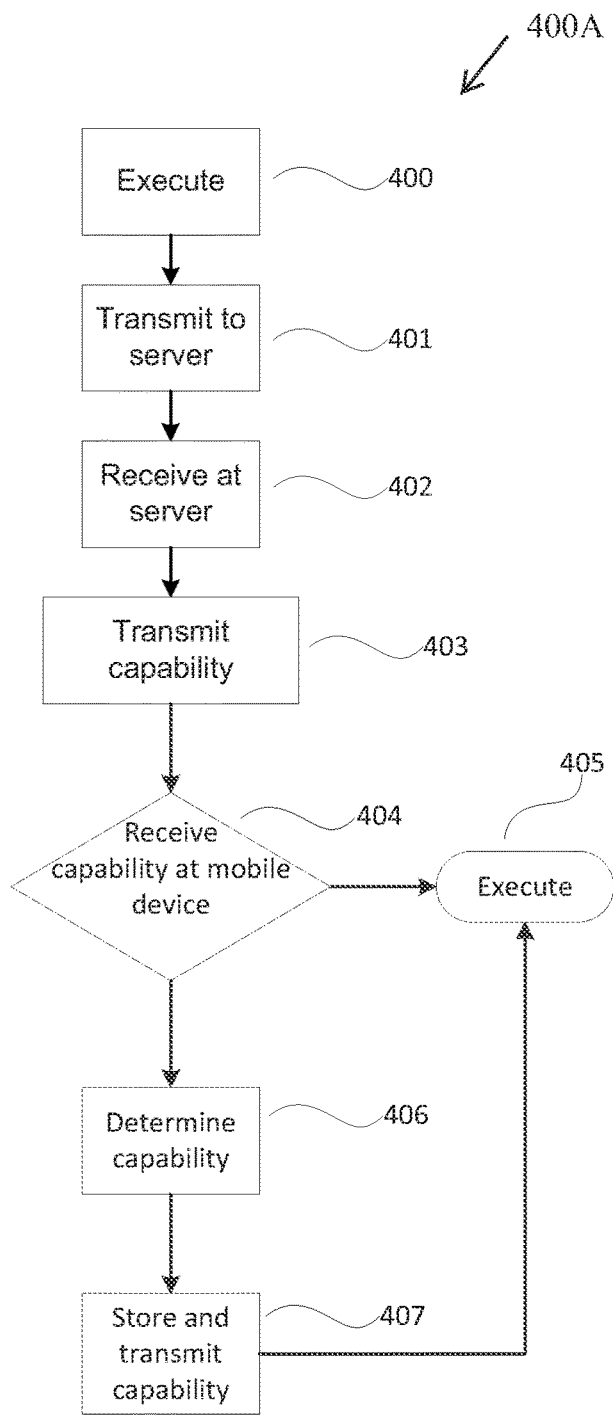
FIG. 4 is a flowchart illustrating one example process, according to one or more embodiments described herein is a schematic diagram of an embodiment of a gaming system in accordance with one or more embodiments described herein.

Referring now to FIG. 4, illustrated therein is a flow chart of a process 400A for optimizing software at a computer system, utilising at least some of the methods (or portions of the methods) described above, as consistent with some embodiments. In accordance with the embodiment(s) illustrated via process 400A, a remote server (e.g., a game provider's server) may assess the capabilities (e.g., processing power capability and/or memory capacity) of a mobile or other device requesting to facilitate the accessing, execution, launching or downloading of a software program (e.g., an online game program) so as to maximize the user's viewing enjoyment of graphical portions of the software program or otherwise maximize the user's enjoyment in using the software program. For example, the remote server may communicate with the mobile device in order to in order to determine a particular version (or configuration) of the software program that should be provided to or executed by the mobile or other device.

At step 400 execution of a computer program commences on a mobile device. As explained above, this example is given in relation to a web-browser based program on a mobile device, but the principles described are applicable to any program running on any type of device. The computer program may comprise, for example, an online game application. For example, a mobile device may request to launch, initiate, access or download an online game application from a remote game server and thus trigger the process 400A.

At step 401 information identifying the mobile device and/or information comprising an indication of at least one performance capability may be transmitted to a remote server (such as computing system 200 of FIG. 2). The information may be model details, a unique identifier for the particular device, or any other identifying information which the server can utilize to attempt to ascertain the device's performance capabilities (e.g., processing capability and/or memory capacity).

At step 402 the server receives the identifying information and attempts to measure, detect or identify (e.g., based on previous measurements or assessments of the device) the capabilities or performance indicators of the device. For example, the server may use the identifying information to check for parameters stored in its own database, or may utilize external resources.

At step 403 if details of the device's capabilities are found for the device, an indication of those capabilities (e.g., parameters representing those capabilities or a category or class associated with the device that represents those capabilities) is returned to the device. The indication may be a quantitative representation of one or more capabilities (for example frame rates or memory size), a simple indication of "high" or "low" capabilities, or any other means to indicate relative capability of the device. If capability information could not be identified for the device then an indication of the lack of information is returned to the device. If capability information is available for the identified device, but they are deemed in adequate or insufficient for some reason (e.g., only a small number of measurements have been returned (for example less than 10), or the information is not sufficiently recent) the server may respond with an indication that capability information is not available because the data available is not sufficiently accurate or reliable.

At step 404, the mobile device receives the indication and determines whether an indication of capability was returned or not. If an indication was returned, the software program in connection with which the indication was requested may be executed or accessed at step 405. The indication of capability may be utilized as noted above to select a particular version of the software application or to configure the software application appropriately based on the capabilities of the device (e.g., a value for a particular parameter of the software application may be selected). For example, the mobile device or software program may determine whether high or low quality graphics are to be requested and/or utilized during operation of the software. In some embodiments, the server itself may make a determination of whether an indication of capability is available for the device and select the software application (or select particular aspects of the software application, such as quality of graphics) to be provided to the mobile device.

If an indication of capability was not returned or it was determined that a reliable indication of capability is not available, process 400A continues to step 406 where the process 100A or a similar process may be performed to determine the capability of the device.

Once the capability of a mobile device has been determined, at step 407, the capability information and identifying information is transmitted to the server for storage and future reference (in some embodiments, the capability information is also stored at the mobile device). Process 400A then continues to step 405 for execution of the software application utilizing the capability information in the described manner herein (e.g., selecting an appropriate version of the software application or configuring the software application to utilize certain data such as certain quality of graphics based on the determined capabilities of the mobile device on which the software application is to be executed).

In accordance with some embodiments, at least some of the steps of process 400 may be performed prior to the execution of software providing the main services for which it is being run. For example, the software may be a game and process 400 may be executed prior to that game starting or the software for the game being launched in earnest. In accordance with some embodiments, the game or other software application which a user is requesting to execute or launch may display a loading screen to inform the user that something is occurring but the user may not be made aware of the details indicating that the performance capabilities of his device are being assessed. In other embodiments, process 400A may be performed by the same software as provides the game or other software application for which the capability assessment is being performed, or may be provided by separate software or modules.

As described herein, the capability information for a particular mobile device may in some embodiments be stored locally to the device and if such local information is found the information may be subsequently used directly by the mobile device (e.g., to determine a version of the software application to execute or access or to determine how to configure a parameter of the software application, such as the quality or type of graphics to be utilized).

In some embodiments, certain steps (e.g., steps 401-403) of process 400A may be omitted. In some embodiments, a mobile device may run process 100A (FIG. 1) every time certain software (e.g., software available in different versions or configurable in different manners based on the capabilities of the mobile device) is run or a request to access or execute certain software is received, or at particular intervals.

Aspects of the methods described herein may be embodied in programming. Program aspects of the technology may be thought of as "products" or "articles of manufacture" typically in the form of executable code and/or associated data that is carried on or embodied in a type of machine readable medium and/or in a plurality of such media. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Figure 5:
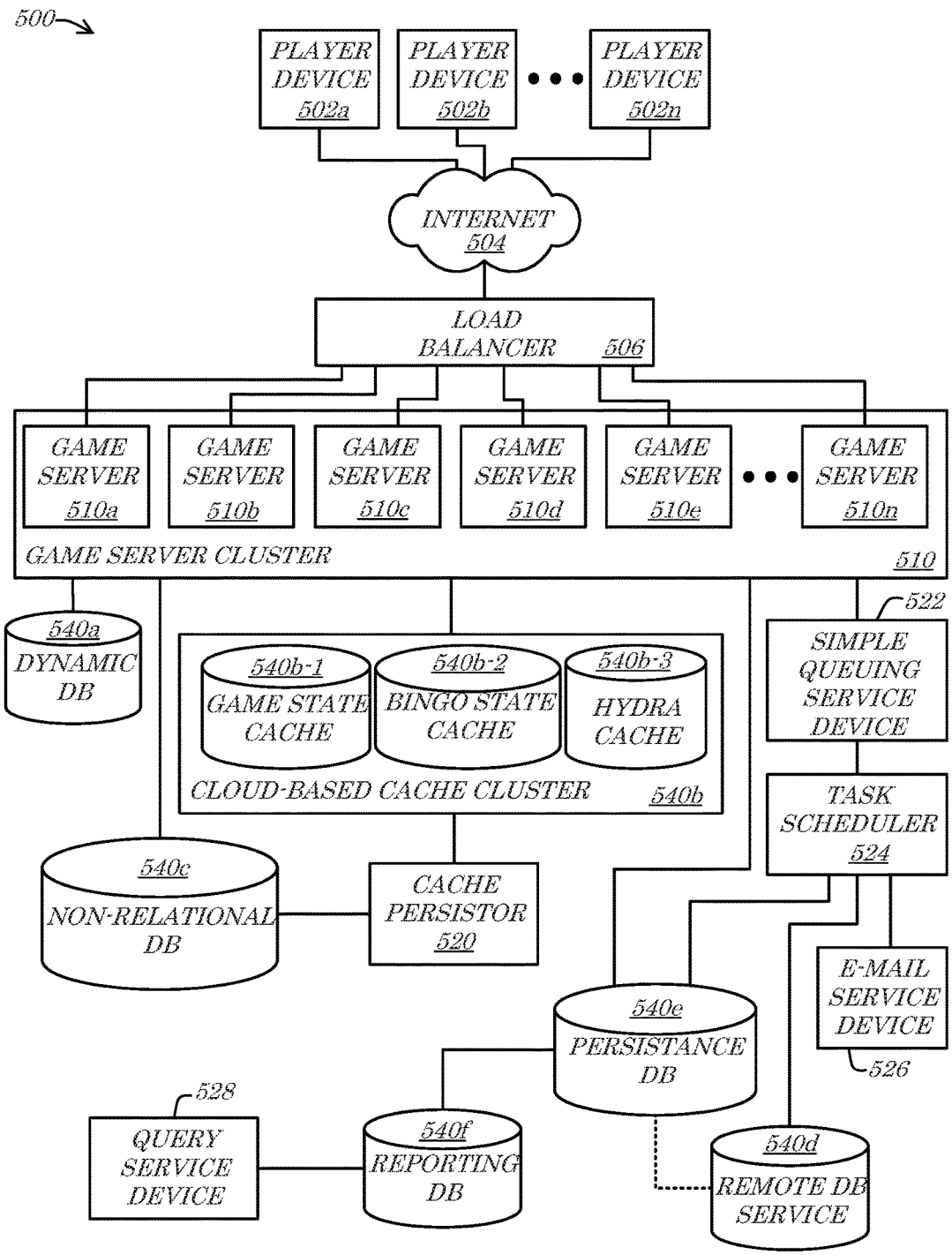
FIG. 5 is a schematic diagram of an embodiment of a computing environment comprising an online game provider platform, consistent with one or more embodiments described herein.

Referring now to FIG. 5, illustrated therein is a block diagram of an example system 500, which is consistent with some embodiments. In accordance with some embodiments, the system 500 may comprise a plurality of player devices 502a-n, the Internet 504, a load balancer 506, and/or a game server cluster 510. The game server cluster 510 may, in some embodiments, comprise a plurality of game servers 510a-n. In some embodiments, the system 500 may comprise a cache persistor 520, a Simple Queuing Service (SQS) device 522, a task scheduler 524, an e-mail service device 526, and/or a query service device 528. As depicted in FIG. 5, any or all of the various components 502a-n, 504, 506, 510a-n, 520, 522, 524, 526, 528 may be in communication with and/or coupled to one or more databases 540a-f. The system 500 may comprise, for example, a dynamic DataBase (DB) 540a, a cloud-based cache cluster 540b (e.g., comprising a game state cache 540b-1, a slot state cache 540b-2, and/or a "hydra" cache 540b-3), a non-relational DB 540c, a remote DB service 540d, a persistence DB 540e, and/or a reporting DB 540f.

According to some embodiments, any or all of the components 502a-n, 504, 506, 510a-n, 520, 522, 524, 526, 528, 540a-f of the system 500 may be similar in configuration and/or functionality to any similarly named and/or numbered components described herein. Fewer or more components 502a-n, 504, 506, 510a-n, 520, 522, 524, 526, 528, 540a-f (and/or portions thereof) and/or various configurations of the components 502a-n, 504, 506, 510a-n, 520, 522, 524, 526, 528, 540a-f may be included in the system 500 without deviating from the scope of embodiments described herein. While multiple instances of some components 502a-n, 510a-n, 540a-f are depicted and while single instances of other components 504, 506, 520, 522, 524, 526, 528 are depicted, for example, any component 502a-n, 504, 506, 510a-n, 520, 522, 524, 526, 528, 540a-f depicted in the system 500 may comprise a single device, a combination of devices and/or components 502a-n, 504, 506, 510a-n, 520, 522, 524, 526, 528, 540a-f, and/or a plurality of devices, as is or becomes desirable and/or practicable. Similarly, in some embodiments, one or more of the various components 502a-n, 504, 506, 510a-n, 520, 522, 524, 526, 528, 540a-f may not be needed and/or desired in the system 500.

According to some embodiments, the player devices 502a-n may be utilized to access (e.g., via the Internet 504 and/or one or more other networks not explicitly shown) content provided by the game server cluster 510. The game server cluster 510 may, for example, provide, manage, host, and/or conduct various online and/or otherwise electronic games such as online bingo, slots, poker, and/or other games of chance, skill, and/or combinations thereof. In some embodiments, the various game servers 510a-n (virtual and/or physical) of the game server cluster 510 may be configured to provide, manage, host, and/or conduct individual instances of available game types. A first game server 510a, for example, may host a first particular instance of an online wagering game, a second game server 510c may host a second particular instance of an online wagering game, a third game server 510c may facilitate an online poker tournament, and/or a fourth game server 510d may provide an online slot-type game tournament.

In accordance with some embodiments, one of the game servers in game server cluster 510 may be operable to communicate with a player device in order to assess the capabilities of the player device in accordance with the processes described herein (e.g., measure the fps of the player device based on display of a plurality of series of images provided to the player device). In accordance with some embodiments, one of the game servers of game server cluster may direct a player device to another server device (e.g., another game server of game server cluster 510 or another server associated with the game provider of game server cluster 510) upon receiving a request from the player device for a game instance and determining that the software comprising the game is available in different versions depending on the capabilities of the player device (or that at least one parameter of the software comprising the game is configurable for player devices of different capabilities), prior to or in conjunction with serving or providing the game to the player device, so that the capabilities of the player device may be assessed by the other server device. In some embodiments, the other server device may then provide the game server of the game server cluster 510 an indication of the capabilities of the player device such that the game server may provide or output the appropriate version of the game or appropriate aspect or parameter of the game (e.g., the appropriate quality or type of graphics) to the player device based on the indication. In other embodiments, the game server of the game server cluster 510 that is to provide (or is providing) the game to a player device may receive such an indication from the player device (e.g., after the player device performs a process such as process 100A of FIG. 1). Thus, in some embodiments, game server cluster 510 or another component of system 500 may be operable to carry out at least a portion of process 100A (FIG. 1) and/or process 400A (FIG. 4).

In some embodiments, the player devices 502a-n may comprise various components (hardware, firmware, and/or software; not explicitly shown) that facilitate game play and/or interaction with the game server cluster 510. For example, a player device 502 may include a program that facilitates the measuring or detecting of relevant capabilities of the player device (e.g., a program that facilitates the performance of program 100A) and the providing of an indication of the capabilities to game server cluster 510. The player device 502a-n may, for example, comprise a gaming client such as a software application programmed in Adobe® Flash® and/or HTML 5 that is configured to send requests to, and receive responses from, one or more of the game servers 510a-n of the game server cluster 510. In some embodiments, such an application operating on and/or via the player devices 502a-n may be configured in Model-View-Controller (MVC) architecture with a communication manager layer responsible for managing the requests to/responses from the game server cluster 510. In some embodiments, one or more of the game servers 510a-n may also or alternatively be configured in a MVC architecture with a communication manager and/or communications management layer. In some embodiments, communications between the player devices 502a-n and the game server cluster 510 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 502a-n and the game server cluster 510 may be managed and/or facilitated by the load balancer 506. The load balancer 506 may, for example, route communications from player devices 502a-n to one or more of the specific game servers 510a-n depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/stickiness). In some embodiments, the load balancer 506 may comprise one or more devices and/or services provided by a third-party (not shown). The load balancer 506 may, for example, comprise an Elastic Load Balancer (ELB) service provided by Amazon® Web Services, LLC of Seattle, Wash. According to some embodiments, such as in the case that the load balancer 506 comprises the ELB or a similar service, the load balancer 506 may manage, set, determine, define, and/or otherwise influence the number of game servers 510a-n within the game server cluster 510. In the case that traffic and/or requests from the player devices 502a-n only require the first and second game servers 510a-b, for example, all other game servers 510c-n may be taken off-line, may not be initiated and/or called, and/or may otherwise not be required and/or utilized in the system 500. As demand increases (and/or if performance, security, and/or other issues cause one or more of the first and second game servers 510a-b to experience detrimental issues), the load balancer 506 may call and/or bring online one or more of the other game servers 510c-n depicted in FIG. 5. In the case that each game server 510a-n comprises an instance of an Amazon® Elastic Compute Cloud (EC2) service, the load balancer 506 may add or remove instances as is or becomes practicable and/or desirable.

In some embodiments, the load balancer 506 and/or the Internet 504 may comprise one or more proxy servers and/or devices (not shown in FIG. 5) via which communications between the player devices 502a-n and the game server cluster 510 are conducted and/or routed. Such proxy servers and/or devices may comprise one or more regional game hosting centers, for example, which may be geographically dispersed and addressable by player devices 502a-n in a given geographic proximity. In some embodiments, the proxy servers and/or devices may be located in one or more geographic areas and/or jurisdictions while the game server cluster 510 (and/or certain game servers 510a-n and/or groups of game servers 510a-n thereof) is located in a separate and/or remote geographic area and/or jurisdiction.

According to some embodiments, for some game types the game server cluster 210 may provide game outcomes to a controller device (not separately shown in FIG. 5) that times the release of game outcome information to the player devices 502a-n such as by utilizing a broadcaster device (also not separately shown in FIG. 5) that transmits the time-released game outcomes to the player devices 502a-n (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 510 (and/or one or more of the game servers 510a-n thereof) may be in communication with the dynamic DB 540a. According to some embodiments, the dynamic DB 540a may comprise a dynamically-scalable database service such as the DyanmoDB™ service provided by Amazon® Web Services, LLC. The dynamic DB 540a may, for example, store information specific to one or more certain game types (e.g., a reeled slots themed game) provided by the game server cluster 510 such as to allow, permit, and/or facilitate reporting and/or analysis of such information. In one embodiment the dynamic DB 540a may store information regarding the performance capabilities of specific player devices that have accessed game via the game server cluster 510.

According to some embodiments, the game server cluster 510 (and/or one or more of the game servers 510a-n thereof) may be in communication with the cloud-based cache cluster 540b. Game state information from the game server cluster 510 may be stored in the game state cache 540b-1, for example, slot state (e.g., slot-game specific state) data may be stored in the slot state cache 540b-2, and/or other game and/or player information (e.g., progressive data, player rankings, audit data) may be stored in the hydra cache 540b-3. In some embodiments, the cache persistor 520 may move and/or copy data stored in the cloud-based cache cluster 540b to the non-relational DB 540c. The non-relational DB 540c may, for example, comprise a SimpleDB™ service provided by Amazon® Wed Services, LLC. According to some embodiments, the game server cluster 510 may generally access the cloud-based cache cluster 540b as-needed to store and/or retrieve game-related information (e.g., different images or graphics to be used in different games, different types or quality levels of graphics for a given game, to be selected and used based on the capabilities of the particular device on which the game is being output). The data stored in the cloud-based cache cluster 540b may generally comprise a subset of the newest or freshest data, while the cache persistor 520 may archive and/or store or move such data to the non-relational DB 540c as it ages and/or becomes less relevant (e.g., once a player logs-off, once a game session and/or tournament ends). The game server cluster 510 may, in accordance with some embodiments, have access to the non-relational DB 540c as-needed and/or desired. The game servers 510a-n may, for example, be initialized with data from the non-relational DB 540c and/or may store and/or retrieve low frequency and/or low priority data via the non-relational DB 540c.

In some embodiments, the SQS device 522 may queue and/or otherwise manage requests, messages, events, and/or other tasks or calls to and/or from the game server cluster 510. The SQS device 522 may, for example, prioritize and/or route requests between the game server cluster 510 and the task scheduler 524. In some embodiments, the SQS device 522 may provide mini-game and/or tournament information to the server cluster 510 or may be operable to assess the capabilities of a player device (e.g., to perform at least some of the steps of process 100A and/or process 400A). According to some embodiments, the task scheduler 524 may initiate communications with the SQS device 522, the e-mail service provider 526 (e.g., providing e-mail lists), the remote DB service 540d (e.g., providing inserts and/or updates), and/or the persistence DB 540e (e.g., providing and/or updating game, player, and/or other reporting data), e.g., in accordance with one or more schedules.

According to some embodiments, the persistence DB 540e may comprise a data store of live environment game and/or player data. The game server cluster 510 and/or the task scheduler 524 or SQS device 522 may, for example, store game and/or player data to the persistence DB 540e and/or may pull and/or retrieve data from the persistence DB 540e, as-needed and/or desired. The game server cluster 510 may, according to some embodiments, provide and/or retrieve spin and/or other game event info and/or configuration information via the persistence DB 540e.

In some embodiments, the reporting DB 540f may be created and/or populated based on the persistence DB 540e. On a scheduled and/or other basis, for example, a data transformation and/or mapping program may be utilized to pull data from the live environment (e.g., the persistence DB 540e) into the reporting DB 540f. The query service 528 may then be utilized, for example, to query the reporting DB 540f, without taxing the live environment and/or production system directly accessible by the game server cluster 510.

The player devices 520 of system 500 may, in some embodiments, comprise mobile devices as these have been described with reference to FIG. 1-4. The game server cluster 520 or another component of system 500 may, in some embodiments, comprise a computing system 200 as it has been described with reference to FIG. 2.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium or an article of manufacture, which may be non-transitory in nature). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory", "article of manufacture" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

What is claimed is:

1. A method of remotely analyzing performance capability of a mobile device in order to optimize output of a software application on the mobile device, the method comprising:
    receiving, at a mobile device and from a remote server, a plurality of images;
    storing the plurality of images in non-working memory of the mobile device, each image being a transparent image;
    retrieving a first subset of the plurality of images from the non-working memory;
    displaying the first subset of the plurality of images on a display of the mobile device, wherein the displaying comprises:
        (a) starting a timer upon a first image of the first subset of the plurality of images being displayed, thereby determining a first start time for a display of the first subset of the plurality of images;
        (b) stopping the timer upon a last image of the first subset of the plurality of images being displayed, thereby determining a first end time for the display of the first subset of the plurality of images; and
        (c) determining, based on the first start time and the first end time, a first elapsed time taken to display the first subset of the plurality of images;
    repeating, for at least one additional subset of the plurality of images, the displaying including steps (a), (b) and (c) until it is determined that predetermined condition has been satisfied, wherein each subset of images includes a greater number of images than a preceding subset of images;
    calculating an indication of performance for the mobile device based at least in part on the times to display the series of images;
    selecting, based on the indication of performance, at least one parameter of a software application for which information is to be output via the display of the mobile device; and
    applying the indication of performance to select and display via the display device, when executing the software application, one of high quality images and low quality images when outputting information corresponding to the software application.

2. The method of claim 1, wherein the indication of performance comprises an indication of at least one of a processor capability and a memory capacity.

3. The method of claim 1, wherein a determination that the predetermined condition has been satisfied comprises a determination that an elapsed time corresponding to a particular subset of the plurality of images is above a threshold time.

4. The method of claim 1, wherein a determination that the predetermined condition has been satisfied comprises a determination that a predetermined number of subsets of the plurality of images have been displayed.

5. The method of claim 1, further comprising:
    storing the first elapsed time as corresponding to the first subset of the plurality of images in a memory of a computing device, the computing device comprising at least one of the mobile device and a remote server device.

6. The method of claim 1, wherein calculating the indication of performance comprises calculating a value indicating a memory capacity of the mobile device based on a number of images in a particular subset of images displayed prior to a subset of images for which a frame rate was determined to be below a predetermined threshold.

7. The method of claim 1, wherein calculating the indication of performance comprises calculating a value indicating a processor capability of the mobile device based on an average frame rate achieved for the display of a particular subset of the plurality of images, where the frame rate for that particular subset of the plurality of images is substantially consistent with a frame rate for at least one other subset of the plurality of images.

8. The method of claim 1, further comprising:
    transmitting the indication of performance to a remote server.

9. The method of claim 1, wherein applying the indication of performance to select and display one of high quality images and low quality images when outputting information corresponding to the software application comprises:
    applying the indication of performance to select one of a first version of the software application or a second version of the software application.

10. A system for of remotely analyzing performance capability of a mobile device in order to optimize output of a software application on the mobile device, the system comprising:
- a processor; and
- a memory storing a first program for controlling the processor, the processor being operable with the first program to:
- receive, at a mobile device and from a remote server, a plurality of images;
- store the plurality of images in non-working memory of the mobile device, each image being a transparent image;
- retrieve a first subset of the plurality of images from the non-working memory;
- display the first subset of the plurality of images on a display of the mobile device, wherein the displaying comprises:
  - (a) starting a timer upon a first image of the first subset of the plurality of images being displayed, thereby determining a first start time for a display of the first subset of the plurality of images;
  - (b) stopping the timer upon a last image of the first subset of the plurality of images being displayed, thereby determining a first end time for the display of the first subset of the plurality of images; and
  - (c) determining, based on the first start time and the first end time, a first elapsed time taken to display the first subset of the plurality of images;
- repeat, for at least one additional subset of the plurality of images, the displaying including steps (a), (b) and (c) until it is determined that predetermined condition has been satisfied, wherein each subset of images includes a greater number of images than a preceding subset of images;
- calculate an indication of performance for the mobile device based at least in part on the times to display the series of images;
- select, based on the indication of performance, at least one parameter of a second program for which information is to be output via the display of the mobile device; and
- apply the indication of performance to select and display via the display device, when executing the software application, one of high quality images and low quality images when outputting information corresponding to the software application.

11. The system of claim 10, wherein the indication of performance comprises an indication of at least one of a processor capability and a memory capacity.

12. The system of claim 10, wherein a determination that the predetermined condition has been satisfied comprises a determination that an elapsed time corresponding to a particular subset of the plurality of images is above a threshold time.

13. The system of claim 10, wherein a determination that the predetermined condition has been satisfied comprises a determination that a predetermined number of subsets of the plurality of images have been displayed.

14. The system of claim 10, wherein the processor is further operable with the first program to:
- store the first elapsed time as corresponding to the first subset of the plurality of images in a memory of a computing device, the computing device comprising at least one of the mobile device and a remote server device.

15. The system of claim 10, wherein calculating the indication of performance comprises calculating a value indicating a memory capacity of the mobile device based on a number of images in a particular subset of images displayed prior to a subset of images for which a frame rate was determined to be below a predetermined threshold.

16. The system of claim 10, wherein calculating the indication of performance comprises calculating a value indicating a processor capability of the mobile device based on an average frame rate achieved for the display of a particular subset of the plurality of images, where the frame rate for that particular subset of the plurality of images is substantially consistent with a frame rate for at least one other subset of the plurality of images.

17. The system of claim 10, wherein the processor is further operable with the first program to:
- transmit the indication of performance to a remote server.

18. The system of claim 10, wherein the processor being operable with the program to apply the indication of performance to select and display one of high quality images and low quality images when outputting information corresponding to the software application comprises the processor being operable with the program to:
- apply the indication of performance to select one of a first version of the software application or a second version of the software application.

* * * * *